(12) United States Patent
Tomikawa et al.

(10) Patent No.: US 12,540,934 B2
(45) Date of Patent: Feb. 3, 2026

(54) BIOLOGICAL MUCOUS MEMBRANE MODEL AND METHOD OF EVALUATING RETENTION OF MUCOUS MEMBRANE PROTECTIVE AGENT

(71) Applicant: FUJIFILM Corporation, Tokyo (JP)

(72) Inventors: Haruki Tomikawa, Ashigarakami-gun (JP); Toshihide Yoshitani, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 824 days.

(21) Appl. No.: 17/865,877

(22) Filed: Jul. 15, 2022

(65) Prior Publication Data
US 2022/0365056 A1 Nov. 17, 2022

Related U.S. Application Data

(63) Continuation of application No. PCT/JP2021/000691, filed on Jan. 12, 2021.

(30) Foreign Application Priority Data

Jan. 16, 2020 (JP) ................................ 2020-005266

(51) Int. Cl.
*G01N 33/15* (2006.01)
*G01N 33/92* (2006.01)

(52) U.S. Cl.
CPC ............. *G01N 33/15* (2013.01); *G01N 33/92* (2013.01)

(58) Field of Classification Search
CPC .......... G01N 33/15; G01N 33/92; C08L 5/12; C08L 89/06

(Continued)

(56) References Cited

U.S. PATENT DOCUMENTS

2008/0029390 A1* 2/2008 Roche ................ A61B 5/14532
435/14
2011/0305736 A1 12/2011 Wieland et al.
(Continued)

FOREIGN PATENT DOCUMENTS

CN 101932624 A 12/2010
EP 3 950 056 A1 2/2022
(Continued)

OTHER PUBLICATIONS

Office Action issued in corresponding Japanese Application No. 2021-571183 on Jan. 10, 2023, with English translation.
(Continued)

*Primary Examiner* — Maureen Wallenhorst
(74) *Attorney, Agent, or Firm* — Birch, Stewart, Kolasch & Birch, LLP

(57) ABSTRACT

The present invention provides a biological mucous membrane model having high reproducibility of the evaluation result of the retention that is obtained in a case where a mucous membrane protective agent is applied to the mucous membrane of the living body, in a case where the mucous membrane protective agent such as an oral mucous membrane protective agent is applied; and a method of evaluating retention of a mucous membrane protective agent. The biological mucous membrane model according to the embodiment of the present invention has a hydrogel layer, a lipid-containing layer containing a lipid, which is disposed on the hydrogel layer and has through-holes along in a thickness direction, and a hydrophilic polymer layer disposed on the lipid-containing layer in this order.

20 Claims, 1 Drawing Sheet

(58) Field of Classification Search
USPC .......................................... 436/71; 73/866.4
See application file for complete search history.

(56) References Cited

U.S. PATENT DOCUMENTS

| | | | |
|---|---|---|---|
| 2015/0027625 A1 | 1/2015 | Wright et al. | |
| 2015/0320915 A1 | 11/2015 | Schmidt et al. | |
| 2017/0270831 A1 | 9/2017 | Norikane et al. | |
| 2018/0031465 A1* | 2/2018 | Di Cagno | G01N 15/0826 |
| 2018/0357930 A1 | 12/2018 | Kuwabara et al. | |
| 2019/0300628 A1 | 10/2019 | Saito et al. | |
| 2021/0177736 A1* | 6/2021 | Tomikawa | A61K 9/5161 |
| 2021/0196826 A1* | 7/2021 | Chiba | A61K 47/186 |
| 2021/0379098 A1 | 12/2021 | Chiba et al. | |
| 2022/0392373 A1 | 12/2022 | Matsumoto et al. | |

FOREIGN PATENT DOCUMENTS

| | | | |
|---|---|---|---|
| JP | 2005-128138 A | 5/2005 | |
| JP | 2014-226403 A | 12/2014 | |
| JP | 2016-502874 A | 2/2016 | |
| JP | 2016-49103 A | 4/2016 | |
| JP | 2017-107094 A | 6/2017 | |
| JP | 2017-165040 A | 9/2017 | |
| JP | 2018-9096 A | 1/2018 | |
| JP | 2018-17769 A | 2/2018 | |
| JP | 2019-31464 A | 2/2019 | |
| JP | 2019-177509 A | 10/2019 | |
| KR | 10-2010-0030324 A | 3/2010 | |
| WO | 2020/045133 A1 * | 3/2020 | |
| WO | 2020/059543 A1 * | 3/2020 | |
| WO | WO 2020/202926 A1 | 10/2020 | |
| WO | WO 2021/132204 A1 | 7/2021 | |

OTHER PUBLICATIONS

Chinese Office Action and Search Report for corresponding Chinese Application No. 202180009499.0, dated Oct. 28, 2023, with English translation.

Eshel-Green et al., "PEGDA hydrogels as a replacement for animal tissues in mucoadhesion testing," International Journal of Pharmaceutics, vol. 506, 2016, pp. 25-34.

Extended European Search Report for corresponding European Application No. 21741233.7, dated Feb. 28, 2023.

Japanese Notice of Reasons for Refusal for corresponding Japanese Application No. 2021-571183, dated Mar. 28, 2023, with an English translation.

Xia et al., "Tetramethylpyrazine-Loaded Hydrogels: Preparation, Penetration Through a Subcutaneous-Mucous-Membrane Model, and a Molecular Dynamics Simulation," AAPS PharmSciTech, vol. 18, No. 5, 2017, pp. 1720-1727.

Ziegler et al., "Agar-supported lipid bilayers—basic structures for biosensor design. Electrical and mechanical properties," Colloids and Surfaces A: Physicochemical and Engineering Aspects, vol. 140, 1998, pp. 357-367.

International Preliminary Report on Patentability and Written Opinion of the International Searching Authority (Forms PCT/IB/326, PCT/IB/373, and PCT/ISA/237) for International Application No. PCT/JP2021/000691, dated Jul. 28, 2022, with an English translation.

International Search Report (Form PCT/ISA/210) for International Application No. PCT/JP2021/000691, dated Apr. 13, 2021, with an English translation.

* cited by examiner

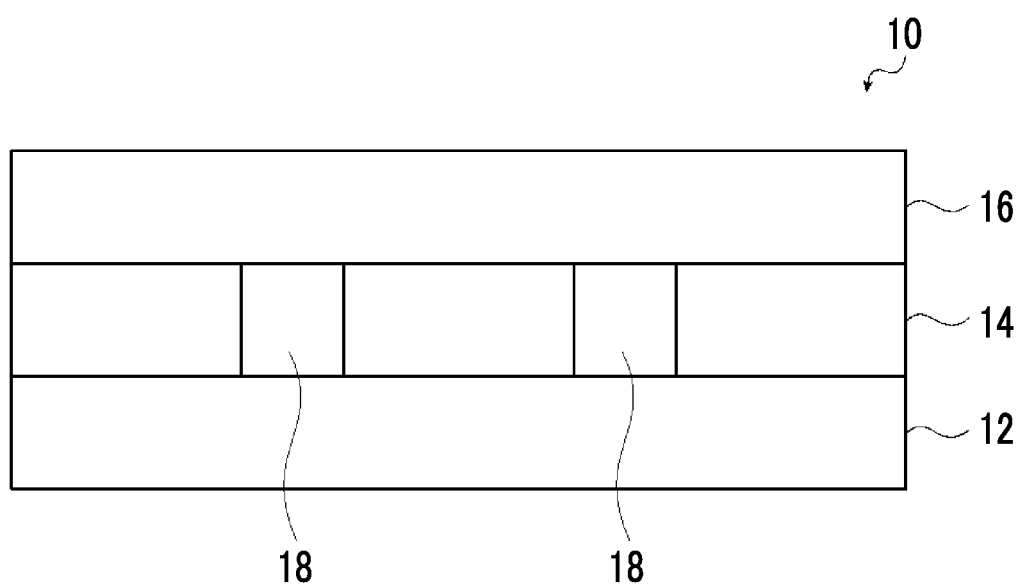

BIOLOGICAL MUCOUS MEMBRANE MODEL AND METHOD OF EVALUATING RETENTION OF MUCOUS MEMBRANE PROTECTIVE AGENT

CROSS-REFERENCE TO RELATED APPLICATIONS

This application is a Continuation of PCT International Application No. PCT/JP2021/000691 filed on Jan. 12, 2021, which claims priority under 35 U.S.C. § 119(a) to Japanese Patent Application No. 2020-005266 filed on Jan. 16, 2020. The above application is hereby expressly incorporated by reference, in its entirety, into the present application.

BACKGROUND OF THE INVENTION

1. Field of the Invention

The present invention relates to a biological mucous membrane model and a method of evaluating the retention of a mucous membrane protective agent.

2. Description of the Related Art

In recent years, in order to evaluate the suitability of materials that are used in a living body, biological simulation models formed of various materials have been studied.

For example, JP2018-9096A discloses a biological simulation model using a hydrogel.

SUMMARY OF THE INVENTION

On the other hand, in association with the development of materials that adhere to and protect the mucous membrane of the living body in recent years, such as an oral mucous membrane protective agent that is used for stomatitis (hereinafter, also simply referred to as a "mucous membrane protective agent"), it is desired to develop a biological mucous membrane model that is used for evaluating the retention of a mucous membrane protective agent on the mucous membrane of the living body. In a case where the above-described biological mucous membrane model is provided, the retention of the mucous membrane protective agent can be evaluated more easily without carrying out the evaluation at the actual mucous membrane of the living body.

The inventors of the present invention evaluated the retention of the mucous membrane protective agent by using such a biological mucous membrane model consisting of a hydrogel layer as described in JP2018-9096A and as a result, found that the evaluation result was poorly correlated with that of the evaluation on the retention in a case where the mucous membrane protective agent was applied to the mucous membrane of the living body. More specifically, in a case where a mucous membrane protective agent having high retention on the mucous membrane of the living body was applied to a biological mucous membrane model, the retention was high, and in a case where a mucous membrane protective agent having low retention on the mucous membrane of the living body was applied to a biological mucous membrane model, the retention was low, which indicated that the reproducibility of the retention was not sufficient.

In consideration of the above circumstances, an object of the present invention is to provide a biological mucous membrane model having high reproducibility of the evaluation result of the retention that is obtained in a case where a mucous membrane protective agent is applied to the mucous membrane of the living body, in a case where the mucous membrane protective agent such as an oral mucous membrane protective agent is applied.

Another object of the present invention is to provide a method of evaluating the retention of the mucous membrane protective agent.

As a result of diligent studies to solve the above-described problems, the inventors of the present invention have completed the present invention having the following aspects.

(1) A biological mucous membrane model comprising, in the following order:
   a hydrogel layer;
   a lipid-containing layer containing a lipid, which is disposed on the hydrogel layer and has through-holes along in a thickness direction; and
   a hydrophilic polymer layer disposed on the lipid-containing layer.

(2) The biological mucous membrane model according to (1), in which the hydrophilic polymer layer contains a polymer having a hydrophilic group selected from the group consisting of a phosphorylcholine group, a hydroxyl group, and a carboxyl group.

(3) The biological mucous membrane model according to (2), in which the polymer having a hydrophilic group has a repeating unit having a hydrophilic group and a repeating unit having no hydrophilic group.

(4) The biological mucous membrane model according to any one of (1) to (3), in which the hydrogel layer contains a polysaccharide.

(5) The biological mucous membrane model according to any one of (1) to (4), in which the hydrogel layer contains agar and gellan gum.

(6) The biological mucous membrane model according to any one of (1) to (5), in which the lipid-containing layer further contains polyvinyl chloride and a plasticizer.

(7) A method of evaluating retention of a mucous membrane protective agent, the method comprising evaluating retention of a mucous membrane protective agent by using the biological mucous membrane model according to any one of (1) to (6).

According to the present invention, it is possible to provide a biological mucous membrane model having high reproducibility of the evaluation result of the retention that is obtained in a case where a mucous membrane protective agent is applied to the mucous membrane of the living body, in a case where the mucous membrane protective agent such as an oral mucous membrane protective agent is applied.

Further, according to the present invention, it is also possible to provide a method of evaluating the retention of the mucous membrane protective agent.

BRIEF DESCRIPTION OF THE DRAWINGS

FIG. 1 is a schematic cross-sectional view illustrating an embodiment of a biological mucous membrane model of the present invention.

DESCRIPTION OF THE PREFERRED EMBODIMENTS

In the present invention, the range indicated by using "to" means a range including both ends before and after "to". For example, a range indicated by "A to B" includes A and B.

The "(meth)acrylate" is a general term including acrylate and methacrylate.

A biological mucous membrane model according to the embodiment of the present invention has a feature point that it has a laminated structure including a hydrogel layer, a lipid-containing layer having through-holes, and a hydrophilic polymer layer. The biological mucous membrane model according to the embodiment of the present invention has a configuration by which the mucous membrane of the living body is simulated, and it can more faithfully reproduce the evaluation result of the retention that is obtained in a case where a mucous membrane protective agent is applied to the mucous membrane of the living body.

It is noted that the living body includes humans and animals other than humans (for example, mammals) Examples of the animal other than humans include primates, rodents (mice, rats, and the like), rabbits, dogs, cats, pigs, cows, sheep, and horses.

Hereinafter, an embodiment of the biological mucous membrane model according to the present invention will be described with reference to the drawing.

FIG. 1 is a schematic cross-sectional view illustrating an embodiment of a biological mucous membrane model according to the embodiment of the present invention.

As illustrated in FIG. 1, a biological mucous membrane model 10 according to the embodiment of the present invention has a hydrogel layer 12, a lipid-containing layer 14, and a hydrophilic polymer layer 16 in this order. Through-holes 18 are provided in the lipid-containing layer 14. It is noted that although two through-holes 18 are illustrated in FIG. 1, the number of through-holes 18 is not particularly limited as described later.

Hereinafter, each member will be described in detail.

<Hydrogel Layer>

The hydrogel layer typically contains a hydrophilic polymer that forms a network structure and water that has been incorporated into the network structure. In addition to the above hydrophilic polymer, any material that can form a gel using water as a solvent may be contained.

Examples of the material that is contained in the hydrogel layer include a natural polymer (for example, a polysaccharide, a protein, or polyamino acids) and a synthetic polymer.

More specific examples thereof include natural polymers such as agar, gelatin, agarose, xanthan gum, gellan gum, sclerotium gum, arabian gum, tragacanth gum, karaya gum, cellulose gum, tamarind gum, guar gum, locust bean gum, glucomannan, chitosan, carrageenan, quince seed, galactan, mannan, starch, dextrin, curdlan, casein, pectin, collagen, fibrin, a peptide, a chondroitin sulfate, a hyaluronate, alginic acid, alginate, and a derivative thereof; and synthetic polymers such as polyethylene oxide, polyvinylpyrrolidone, polyvinyl alcohol, polyacrylamide, polymethacrylamide, and polyethylene glycol.

Among the above, the hydrogel layer preferably contains a polysaccharide in that the reproducibility of the correlation between the evaluation result of the retention in a case where a mucous membrane protective agent is applied to the biological mucous membrane model according to the embodiment of the present invention and the evaluation result of the retention that is obtained in a case where the mucous membrane protective agent is applied to the mucous membrane of the living body is more excellent (hereinafter, also referred to simply as "in that the effect of the present invention is more excellent"), and it more preferably contains agar and gellan gum in that the adhesiveness between the hydrogel layer and the lipid-containing layer is more excellent.

The water content of the hydrogel layer (the water content with respect to the total mass of the hydrogel layer) is not particularly limited; however, it is preferably 90% by mass or more and less than 100% by mass, and more preferably 95% by mass or more and less than 100% by mass in that the effect of the present invention is more excellent.

The thickness of the hydrogel layer is not particularly limited; however, it is preferably 1 to 30 nm and more preferably 5 to 15 nm in that the effect of the present invention is more excellent.

<Lipid-Containing Layer>

The lipid-containing layer is disposed on the hydrogel layer and contains a lipid. In the lipid-containing layer, the lipid tends to be unevenly distributed on the surface side of the lipid-containing layer.

It is noted that in the present specification, the lipid means an amphipathic lipid or an amphipathic substance having a structure similar to the amphipathic lipid. Generally, the lipid has a hydrophilic moiety having polarity and a hydrophobic moiety consisting of a carbon chain. Examples of the hydrophilic moiety include a phosphate group, an amino group, a carboxyl group, a hydroxyl group, and an ion-based group (for example, a quaternary ammonium base group).

The lipid is preferably a compound selected from the group consisting of a primary amine, a secondary amine, a tertiary amine, and a quaternary ammonium salt, and it is more preferably a quaternary ammonium salt.

Among the above, the lipid is preferably a tetraalkylammonium salt.

The number of carbon atoms of the alkyl group in the tetraalkylammonium salt is not particularly limited; however, at least one alkyl group in the tetraalkylammonium salt preferably has 5 or more carbon atoms and more preferably 10 or more carbon atoms in that the effect of the present invention is more excellent. The upper limit thereof is not particularly limited; however, it is preferably 20 or less and more preferably 15 or less.

Among the above, all the alkyl groups in the tetraalkylammonium salt preferably have 5 or more carbon atoms and more preferably 10 or more carbon atoms. The upper limit thereof is not particularly limited; however, it is preferably 20 or less and more preferably 15 or less.

Examples of the lipid include tetradodecyl ammonium bromide, tetrahexadodecyl ammonium bromide, tetraoctadecyl ammonium bromide, and tetradodecyl ammonium chloride.

The content of the lipid in the lipid-containing layer is not particularly limited; however, it is preferably 1% to 10% by mass and more preferably 2% to 5% by mass with respect to the total mass of the lipid-containing layer.

The lipid-containing layer may include other components in addition to the lipid.

The lipid-containing layer may contain a binder, and examples of the binder include a polymer. Examples of the binder include plastic such as polyvinyl chloride, polyvinylidene chloride, polystyrene, polyurethane, polysulfone, polycarbonate, polyarylate, polyamide, or polyvinyl alcohol, a natural resin such as lacquer, a polysaccharide polymer such as agar, and a gelated protein such as gelatin (collagen).

Among them, polyvinyl chloride is preferable in that it is easily available and the softening and curing can be easily adjusted by the mixing ratio with a plasticizer described later.

The content of the binder in the lipid-containing layer is not particularly limited; however, it is preferably 20% to 80% by mass and more preferably 40% to 60% by mass with respect to the total mass of the lipid-containing layer.

The lipid-containing layer may contain a plasticizer.

The plasticizer is a substance that can plasticize the binder and impart softness.

Regarding the kind of plasticizer, a substance that can plasticize a binder may be used depending on the binder to be used. In a case where the binder is the plastic as described above, the plasticizer is preferably an ester compound or an ether compound.

Examples of the plasticizer include di-n-octylphenyl phosphate, 2-nitrophenyl octyl ether, 4-nitrophenyl phenyl ether, dioctyl phosphate, dioctyl sebacate, dibutyl sebacate, and tricresyl phosphate.

The content of the plasticizer in the lipid-containing layer is not particularly limited; however, it is preferably 10% to 80% by mass, more preferably 20% to 70% by mass, and still more preferably 30% to 50% by mass, with respect to the total mass of the lipid-containing layer.

The lipid-containing layer has through-holes along the thickness direction. That is, the lipid-containing layer has through-holes that penetrate from one surface to the other surface.

The size of the through-hole is not particularly limited; however, the diameter of the through-hole is preferably 0.1 to 2 mm and more preferably 0.5 to 1 mm in that the effect of the present invention is more excellent. It is noted that in a case where the opening of the through-hole is not a perfect circle, the major axis thereof shall be the diameter.

The number of through-holes is not particularly limited; however, it is preferably 4 to 36 through-holes/cm$^2$ and more preferably 9 to 25 through-holes/cm$^2$ in that the effect of the present invention is more excellent.

The above "through-holes/cm$^2$" means the number of through-holes per 1 cm$^2$ on the surface (the main surface) of the lipid-containing layer.

The thickness of the lipid-containing layer is not particularly limited; however, it is preferably 0.05 to 1 mm and more preferably 0.1 to 0.5 mm in that the effect of the present invention is more excellent.

<Hydrophilic Polymer Layer>

The hydrophilic polymer layer is a layer that is disposed on the lipid-containing layer and is a layer containing a hydrophilic polymer.

The hydrophilic polymer is a polymer having a hydrophilic group. The hydrophilic group is preferably a hydrophilic group selected from the group consisting of a phosphorylcholine group, a hydroxyl group, and a carboxyl group in that the effect of the present invention is more excellent.

The phosphorylcholine group is a group represented by the following formula. * represents a bonding position.

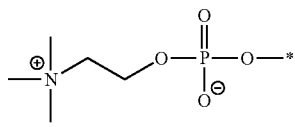 [SMILES: *OP(=O)([O-])OCC[N+](C)(C)C]

The hydrophilic polymer preferably has a repeating unit having the above-described hydrophilic group.

The content of the repeating unit having a hydrophilic group in the hydrophilic polymer is preferably 20% to 80% by mole and more preferably 30% to 70% by mole with respect to all the repeating units in the hydrophilic polymer.

Among the above, the hydrophilic polymer preferably has a repeating unit having no hydrophilic group in that the adhesiveness between the hydrogel layer and the lipid-containing layer is more excellent. The repeating unit having no hydrophilic group is preferably a repeating unit having an alkyl group and having no hydrophilic group, and more preferably an alkyl (meth)acrylate.

Examples of the monomer capable of forming the repeating unit having no hydrophilic group include methyl (meth)acrylate, ethyl (meth)acrylate, butyl (meth)acrylate, lauryl (meth)acrylate, stearyl (meth)acrylate, 2-ethylhexyl (meth)acrylate, benzyl (meth)acrylate, phenoxyethyl (meth)acrylate, cyclohexyl (meth)acrylate, polypropylene glycol mono (meth)acrylate, polytetramethylene glycol mono(meth)acrylate, polypropylene glycol di(meth)acrylate, polytetramethylene glycol mono(meth)acrylate, and polypropylene glycol polyethylene glycol mono(meth)acrylate.

The content of the repeating unit having no hydrophilic group in the hydrophilic polymer is preferably 20% to 80% by mass and more preferably 30% to 70% by mass with respect to all the repeating units in the hydrophilic polymer.

The weight-average molecular weight of the hydrophilic polymer is not particularly limited; however, it is preferably 50,000 to 5,000,000, more preferably 50,000 to 1,000,000, and still more preferably 500,000 to 1,000,000.

The content of the hydrophilic polymer in the hydrophilic polymer layer is not particularly limited; however, it is preferably 80% by mass or more and more preferably 90% by mass or more with respect to the total mass of the hydrophilic polymer layer in that the effect of the present invention is more excellent. The upper limit thereof is not particularly limited; however, examples thereof include 100% by mass.

The hydrophilic polymer layer may contain other components in addition to the above-described hydrophilic polymer.

The thickness of the hydrophilic polymer layer is not particularly limited; however, it is preferably 1 nm to 0.1 mm and more preferably 1 nm to 0.01 mm in that the effect of the present invention is more excellent.

<Method of Manufacturing Biological Mucous Membrane Model>

A method of manufacturing the above-described biological mucous membrane model is not particularly limited, and a known method is adopted.

For example, a hydrogel layer, a lipid-containing layer, and a hydrophilic polymer layer may be separately produced and bonded to each other to manufacture a biological mucous membrane model.

Among the above, a manufacturing method having the following steps 1 to 3 is preferable in that the productivity is more excellent.

Step 1: A step of forming a coating film by using a composition for forming a lipid-containing layer and then providing through-holes in the coating film to form a lipid-containing layer Step 2: A step of heating and applying the composition for forming a hydrogel layer and bringing the coating film into contact with the lipid-containing layer to form a laminate having the hydrogel layer and the lipid-containing layer Step 3: A step of applying a composition for forming a hydrophilic polymer layer onto the lipid-containing layer in the laminate to form a hydrophilic polymer layer Hereinafter, each of the steps will be described in detail.

(Step 1)

The step 1 is a step of forming a coating film by using a composition for forming a lipid-containing layer and then providing through-holes in the coating film to form a lipid-containing layer.

The composition for forming a lipid-containing layer contains at least a lipid. In addition, the composition for forming a lipid-containing layer may contain components (for example, a binder and a plasticizer) that may be contained in the lipid-containing layer.

Further, the composition for forming a lipid-containing layer may contain a solvent. Examples of the solvent include water and an organic solvent.

Examples of the method for forming a coating film using the composition for forming a lipid-containing layer include a method of applying the composition for forming a lipid-containing layer onto a predetermined base material. Examples of the coating method include known methods.

Next, a lipid-containing layer is formed by providing through-holes in the obtained coating film. The method of forming through-holes is not particularly limited, and examples thereof include a method of pressing a needle point holder against the coating film to form through-holes.

After forming the lipid-containing layer having through-holes, the obtained lipid-containing layer may be brought into contact with an aqueous solution containing a salt, such as an aqueous solution of potassium chloride, as necessary.
(Step 2)

The step 2 is a step of heating and applying the composition for forming a hydrogel layer and bringing the coating film into contact with the lipid-containing layer to form a laminate having the hydrogel layer and the lipid-containing layer.

The composition for forming a hydrogel layer contains components for forming the hydrogel layer described above.

Further, the composition for forming a hydrogel layer may contain a solvent. The solvent generally includes water. It is noted that an organic solvent may be further used.

The temperature at which the composition for forming a hydrogel layer is heated is not particularly limited, and the optimum temperature is selected according to the material to be used. Among the above, the temperature is often 70° C. to 100° C.

Examples of the method of applying a heated composition for forming a hydrogel layer include known methods.

Next, the composition for forming a hydrogel layer, the coating film, and the lipid-containing layer are brought into contact with each other to form a laminate having the hydrogel layer and the lipid-containing layer.

In a case where the coating film and the lipid-containing layer are brought into contact with each other, it is preferable that the coating film and the lipid-containing layer are brought into contact with each other before the coating film formed by applying the heated composition for forming a hydrogel layer is cooled to room temperature.
(Step 3)

The step 3 is a step of applying a composition for forming a hydrophilic polymer layer onto the lipid-containing layer in the laminate to form a hydrophilic polymer layer.

The composition for forming a hydrophilic polymer layer contains components for forming the hydrophilic polymer layer described above.

Further, the composition for forming a hydrophilic polymer layer may contain a solvent. Examples of the solvent include water and an organic solvent.

Examples of the method of applying the composition for forming a hydrophilic polymer layer include known methods.
<Use Application>

The biological mucous membrane model according to the embodiment of the present invention can be applied to various use applications.

In particular, it is preferably used to evaluate the retention of a mucous membrane protective agent. More specifically, the retention of a mucous membrane protective agent can be evaluated by attaching the mucous membrane protective agent to the biological mucous membrane model according to the embodiment of the present invention instead of attaching the mucous membrane protective agent to the mucous membrane of the living body to evaluate the retention thereof, and evaluating the retention thereof.

The mucous membrane protective agent is not particularly limited, and examples thereof include an oral mucous membrane protective agent, a gastric mucous membrane protective agent, a rectal mucous membrane protective agent, and a nasal mucous membrane protective agent. Among them, the biological mucous membrane model according to the embodiment of the present invention is suitably used for evaluating the retention of an oral mucous membrane protective agent.

The method of evaluating the retention of a mucous membrane protective agent by using the biological mucous membrane model according to the embodiment of the present invention is not particularly limited, and examples thereof include a method of attaching a mucous membrane protective agent to the biological mucous membrane model and evaluating the retention thereof. In a case of evaluating the retention, a shaking treatment or the like may be carried out as necessary.

EXAMPLES

Example 1

A solution obtained by dissolving tetradodecyl ammonium bromide (manufactured by Sigma-Sigma-Aldrich Co., LLC Co., LLC) (50 mg), polyvinyl chloride (manufactured by Fujifilm Wako Pure Chemical Corporation) (800 mg), and di-n-octylphenyl phosphate (manufactured by Sigma-Aldrich Co., LLC) (0.6 mL) in tetrahydrofuran (manufactured by FUJIFILM Wako Pure Chemical Corporation) (10 cc) was dried in a petri dish at room temperature to obtain a lipid-containing layer (thickness: 200 μm).

Through-holes having a diameter of 1 mm were proved to be 16 through-holes/cm$^2$ in the obtained lipid-containing layer along the thickness direction, and the obtained lipid-containing layer was immersed in an aqueous solution of potassium chloride (concentration: 10 mmol/L) for 1 minute.

Next, agar (Karikorikan, manufactured by Ina Food Industry Co., Ltd.) (0.5 g) and gellan gum (KELCOGEL HM, DSP GOKYO FOOD & CHEMICAL Co., Ltd.) (0.1 g) was to distilled water (49.4 g) while stirring with a stirrer, and the temperature of the obtained solution was raised to 90° C. and heating was carried out until the components thereof were dissolved. The obtained solution was poured into a petri dish, and before the coating film in the petri dish was cooled, the above-described lipid-containing layer having through-holes was bonded onto the coating film to obtain a laminate having the hydrogel layer and the lipid-containing layer. The water content of the hydrogel layer was 99% by mass. In addition, the thickness of the hydrogel layer was 6 mm.

Next, after scraping off the portion of the hydrogel layer spreading outside the lipid-containing layer, an ethanol solution of 2% by mass of 2-methacryloyloxyethyl phosphorylcholine (MPC) polymer (LIPIDURE (registered trade name)—CM5206, manufactured by NOF Corporation) was sprayed on the surface of the lipid-containing layer to form a hydrophilic polymer layer, thereby producing a biological mucous membrane model having the hydrogel layer, the lipid-containing layer, and the hydrophilic polymer layer in this order.

It is noted that the MPC polymer has a repeating unit having a phosphorylcholine group and a repeating unit having no hydrophilic group.

Example 2

A biological mucous membrane model was produced according to the same procedure as in Example 1 except that gellan gum was not used.

Example 3

A laminate having a hydrogel layer and a lipid-containing layer was obtained according to the same procedure as in Example 1.

Next, the surface of the lipid-containing layer was covered with a methanol solution of 1% by mass of benzophenone and allowed to stand for 30 seconds, and then the methanol solution was removed, and the surface was air-dried. Then, the obtained laminate was immersed in an aqueous solution of 0.5 M MPC and subjected to irradiation with ultraviolet rays (wavelength: 365 nm, 20 mW/cm$^2$, 3 hours) to obtain a hydrophilic polymer layer which is an MPC graft layer, on the lipid-containing layer.

It is noted that the polymer in the hydrophilic polymer layer is formed of a repeating unit having a phosphorylcholine group and it does not have a repeating unit having no hydrophilic group.

Example 4

A biological mucous membrane model was produced according to the same procedure as in Example 1 except that gelatin was used instead of agar and gellan gum.

Comparative Example 1

Agar (Karikorikan, manufactured by Ina Food Industry Co., Ltd.) (0.5 g) and gellan gum (KELCOGEL HM, DSP GOKYO FOOD & CHEMICAL Co., Ltd.) (0.1 g) were to distilled water (49.4 g) while stirring with a stirrer, and the temperature of the obtained solution was raised to 90° C. and heating was carried out until the components thereof were dissolved. The obtained solution was poured into a petri dish to obtain a hydrogel layer.

The obtained hydrogel layer was used as a biological mucous membrane model.

Comparative Example 2

A laminate consisting of a hydrogel layer and a lipid-containing layer was obtained according to the same procedure as in Example 1 except that a hydrophilic polymer layer was not formed, and used as the biological mucous membrane model.

Comparative Example 3

After forming a hydrogel layer according to the procedure of Comparative Example 1, an ethanol solution of 2% by mass of an MPC polymer (LIPIDURE (registered trade name)—CM5206, manufactured by NOF Corporation) was sprayed on the hydrogel layer to form a hydrophilic polymer layer, thereby producing a biological mucous membrane model consisting of the hydrogel layer and the hydrophilic polymer layer.

Comparative Example 4

A lipid-containing layer was obtained according to the same procedure as in Example 1. An ethanol solution of 2% by mass of an MPC polymer (LIPIDURE (registered trade name)—CM5206, manufactured by NOF Corporation) was sprayed on the obtained lipid-containing layer to from a hydrophilic polymer layer, thereby producing a biological mucous membrane model consisting of the lipid-containing layer and the hydrophilic polymer layer.

Comparative Example 5

A lipid-containing layer was obtained according to the same procedure as in Example 1 and used as the biological mucous membrane model.

Comparative Example 6

A biological mucous membrane model was produced according to the same procedure as in Example 1 except that through-holes were not provided in the lipid-containing layer.

<Evaluation>

(Evaluation of Adhesion Reproducibility of Human Mucous Membrane)

Using the biological mucous membrane models manufactured in Examples and Comparative Examples, the following evaluations were carried out, and a case where all of the following requirements 1 to 3 were satisfied was denoted as reproducibility "A", and a case where any one of them was not satisfied was denoted as reproducibility "B".

Requirement 1: In a case where a therapeutic drug that can adhere to the human oral mucous membrane (Taisho Quick Care (Taisho Pharmaceutical Co., Ltd.), Traful Ointment (DAIICHI SANKYO COMPANY, LIMITED), Episil (Solasia Pharma K.K.), Kenalog Ointment, and ORTEXER Ointment) are each applied onto the biological mucous membrane model to form a coating film (size: 1 cm Φ, thickness: 500 μm), and the evaluation is carried out according to the procedure described later (the retention test), the retention is "A".

Requirement 2: In a case where after applying an aqueous solution of 5% by mass of Sodium alginate on the biological mucous membrane model, an aqueous solution of 2% by mass of Alaq lactate is further applied onto the coating film to form a coating film (size: 1 cm Φ, thickness: 500 μm) gelated on the biological mucous membrane model, and the evaluation is carried out according to the procedure described later (the retention test), the retention is "A".

Requirement 3: In a case where after applying an aqueous solution of 2% by mass of Sodium alginate on the biological mucous membrane model, an aqueous solution of 2% by mass of Alaq lactate is further applied onto the coating film to form a coating film (size: 1 cm Φ, thickness: 500 μm) gelated on the biological mucous membrane model, and the evaluation is carried out according to the procedure described later (the retention test), the retention is "B".

(Retention Test)

The biological mucous membrane model on which the coating film had been disposed was sprayed with artificial saliva (Saliveht) and allowed to stand for 1 minute. Then, the biological mucous membrane model sprayed with artificial saliva was placed in a petri dish, and the petri dish was filled with artificial saliva (Saliveht) until the biological mucous membrane model was soaked. This petri dish was placed in a constant temperature shaker (small shaking incubator manufactured by AS ONE Corporation, 1-6142-01) of 37° C. and shaken at a medium speed (scale: 5). In this test, the time taken until the coating film was peeled off from the biological mucous membrane model was measured, a case where the coating film was not peeled off within 10 minutes was evaluated as retention "A", and a case where the coating film was peeled off within 10 minutes evaluated as retention "B".

(Evaluation of Adhesiveness)

The obtained biological mucous membrane model was sprayed with artificial saliva (Saliveht) and allowed to stand for 1 minute. Then, the biological mucous membrane model sprayed with artificial saliva was placed in a petri dish, and the petri dish was filled with artificial saliva (Saliveht) until the biological mucous membrane model was soaked. This petri dish was placed in a constant temperature shaker (small shaking incubator manufactured by AS ONE Corporation, 1-6142-01) of 37° C. and shaken at a medium speed (scale: 5).

Between the hydrogel layer and the lipid-containing layer, a case where peeling did not occur over 6 hours or more was denoted as "A", a case where peeling occurred after 3 hours or more and less than 6 hours was denoted as "B", a case where peeling occurred after 1 hours or more and less than 3 hours was denoted as "C", and a case where peeling occurred after less than 1 hour was denoted as "D".

In Table 1, the column of "Hydrogel layer" indicates the material used, and a case where the hydrogel layer is not used is indicated as "-". It is noted that "GG" indicates gellan gum.

In the column of "Lipid-containing layer" in Table 1, a case where the lipid-containing layer is used is indicated as "Present", a case where the lipid-containing layer is not used is indicated as "Absent", and a case where a lipid-containing layer in which through-holes are not provided is used is indicated as "Without*"

In the column of "Hydrophilic polymer layer" in Table 1, a case where the hydrophilic polymer layer is formed by using the MPC polymer (LIPIDURE (registered trade name)—CM5206, manufactured by NOF Corporation) is designated as "A", a case where the MPC graft layer is formed is designated as "B", and a case where the hydrophilic polymer layer is not used is indicated as "-".

In the column of "Evaluation of adhesiveness" in Table 1, "-" indicates that the evaluation is not carried out.

Table 1

| | | Example 1 | Example 2 | Example 3 | Example 4 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Member | Hydrogel layer | Agar/GG | Agar | Agar/GG | Gelatin | Agar/GG | Agar/GG | Agar/GG | — | — | Agar/GG |
| | Lipid-containing layer | Present | Present | Present | Present | — | Present | — | Present | Present | Without* |
| | Hydrophilic polymer layer | A | A | B | A | — | — | A | A | — | A |
| Evaluation | Evaluation of adhesion reproducibility of human mucous membrane | A | A | A | A | B | B | B | B | B | B |
| | Evaluation of adhesiveness | A | B | B | B | — | A | — | — | — | C |

As shown in Table 1, the biological mucous membrane model according to the embodiment of the present invention exhibits the desired effect.

Among the above, it has been confirmed that from the comparison between Example 1, Example 2, and Example 4, the adhesiveness is more excellent in a case where the hydrogel layer contains agar and gellan gum.

Further, it has been confirmed that from the comparison between Example 1 and Example 3, the adhesiveness is more excellent in a case where the hydrophilic polymer layer contains a polymer having a repeating unit having a hydrophilic group and a repeating unit having no hydrophilic group.

It is noted that in Comparative Example 1, Kenalog Ointment, ORTEXER Ointment, and Episil did not adhere.

In Comparative Example 2, Episil did not adhere.

In Comparative Example 3, Kenalog Ointment, ORTEXER Ointment, and Episil did not adhere.

In Comparative Examples 4 to 6, Taisho Quick Care, Traful Ointment, and Episil did not adhere.

EXPLANATION OF REFERENCES

10: biological mucous membrane model
12: hydrogel layer
14: lipid-containing layer
16: hydrophilic polymer layer
18: through-hole

What is claimed is:

1. A biological mucous membrane model comprising, in the following order:
   a hydrogel layer;
   a lipid-containing layer containing a lipid, which is disposed on the hydrogel layer and has through-holes along in a thickness direction; and
   a hydrophilic polymer layer disposed on the lipid-containing layer.

2. The biological mucous membrane model according to claim 1,
wherein the hydrophilic polymer layer contains a polymer having a hydrophilic group selected from the group consisting of a phosphorylcholine group, a hydroxyl group, and a carboxyl group.

3. The biological mucous membrane model according to claim 2,
wherein the hydrogel layer contains a polysaccharide.

4. The biological mucous membrane model according to claim 2,
wherein the hydrogel layer contains agar and gellan gum.

5. The biological mucous membrane model according to claim 2,
wherein the lipid-containing layer further contains polyvinyl chloride and a plasticizer.

6. A method of evaluating retention of a mucous membrane protective agent, the method comprising:
attaching the mucous membrane protective agent to the biological mucous membrane model according to claim 2 and evaluating the retention of the mucous membrane protective agent to the biological mucous membrane model.

7. The biological mucous membrane model according to claim 2,
wherein the polymer having a hydrophilic group has a repeating unit having a hydrophilic group and a repeating unit having no hydrophilic group.

8. The biological mucous membrane model according to claim 7,
wherein the hydrogel layer contains a polysaccharide.

9. The biological mucous membrane model according to claim 7,
wherein the hydrogel layer contains agar and gellan gum.

10. The biological mucous membrane model according to claim 7,
wherein the lipid-containing layer further contains polyvinyl chloride and a plasticizer.

11. A method of evaluating retention of a mucous membrane protective agent, the method comprising:
attaching the mucous membrane protective agent to the biological mucous membrane model according to claim 7 and evaluating the retention of the mucous membrane protective agent to the biological mucous membrane model.

12. The biological mucous membrane model according to claim 1,
wherein the hydrogel layer contains a polysaccharide.

13. The biological mucous membrane model according to claim 12,
wherein the hydrogel layer contains agar and gellan gum.

14. The biological mucous membrane model according to claim 12,
wherein the lipid-containing layer further contains polyvinyl chloride and a plasticizer.

15. A method of evaluating retention of a mucous membrane protective agent, the method comprising:
attaching the mucous membrane protective agent to the biological mucous membrane model according to claim 12 and evaluating the retention of the mucous membrane protective agent to the biological mucous membrane model.

16. The biological mucous membrane model according to claim 1,
wherein the hydrogel layer contains agar and gellan gum.

17. The biological mucous membrane model according to claim 16,
wherein the lipid-containing layer further contains polyvinyl chloride and a plasticizer.

18. A method of evaluating retention of a mucous membrane protective agent, the method comprising:
attaching the mucous membrane protective agent to the biological mucous membrane model according to claim 16 and evaluating the retention of the mucous membrane protective agent to the biological mucous membrane model.

19. The biological mucous membrane model according to claim 1,
wherein the lipid-containing layer further contains polyvinyl chloride and a plasticizer.

20. A method of evaluating retention of a mucous membrane protective agent, the method comprising:
attaching the mucous membrane protective agent to the biological mucous membrane model according to claim 1 and evaluating the retention of the mucous membrane protective agent to the biological mucous membrane model.

* * * * *